G. PASSAVANTI.
FILM REEL.
APPLICATION FILED MAR. 17, 1920.
1,429,692.
Patented Sept. 19, 1922.
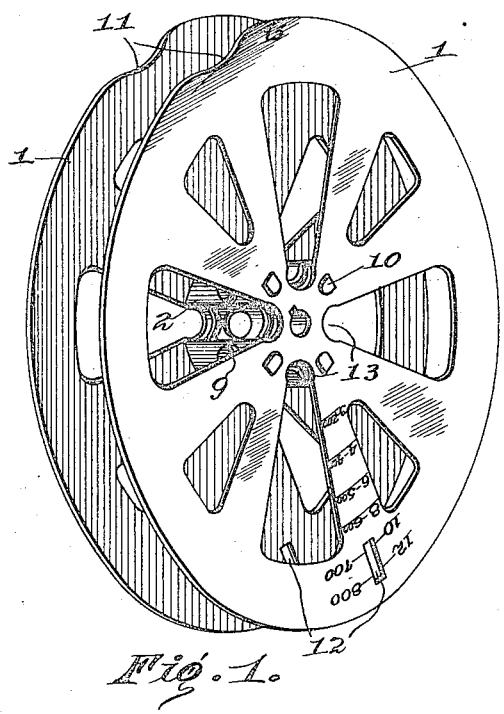
Fig. 1.
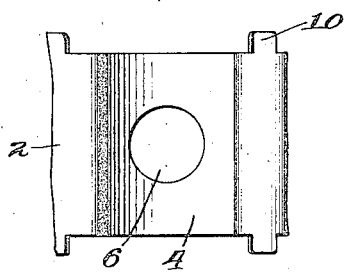
Fig. 4.
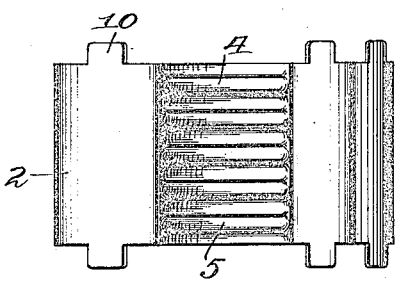
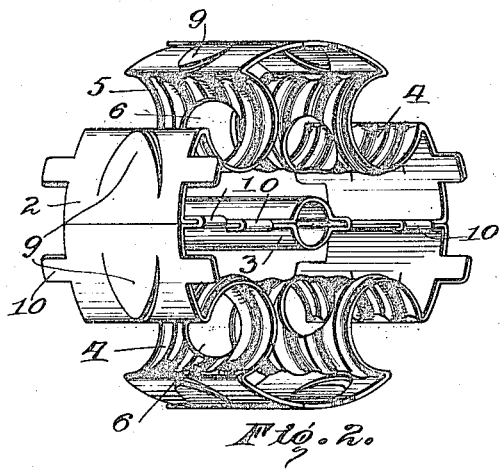
Fig. 2.
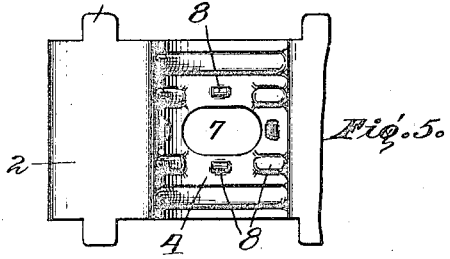
Fig. 3.
Fig. 5.
Inventor
Gerardo Passavanti.
By Howard R. Eccleston
Attorney Patented Sept. 19, 1922.                                                        1,429,692

UNITED STATES PATENT OFFICE.

GERARDO PASSAVANTI, OF NEW YORK, N. Y.

FILM REEL.

Application filed March 17, 1920. Serial No. 366,458.

*To all whom it may concern:*

Be it known that I, GERARDO PASSAVANTI, a subject of the King of Italy, and a resident of New York, in the county and State of New York, have invented certain new and useful Improvements in Film Reels, of which the following is a specification.

This invention relates to film reels, and has for an object to provide a reel, the hub and bearing of which are made from a single sheet of metal properly cut and shaped to the desired form.

Another object of the invention is the construction of a sheet metal hub, the contour being such as to present one or more finger grooves in the periphery thereof, whereby the film end may be secured.

Another object of the invention is to provide such a reel with means to facilitate its removal from the shipping can; such means consisting of two or more of the above mentioned finger grooves, the walls of the grooves being corrugated or provided with any suitable gripping means.

Another object of the invention is to form in such a reel a stamped out tongue for receiving the film end, thereby obviating the necessity of the spring member now ordinarily used with the wooden hub.

Still another object of the invention is to so construct the reel frame that continuous observation of the film coil is possible, and to provide the frame with suitable indicia whereby the time required to run off any length of film may be readily ascertained.

Other and further objects will appear as the description proceeds.

Reference is now to be had to the drawings, in which like reference numerals designate corresponding parts throughout.

In the drawings:

Fig. 1 is a perspective view of the complete reel.

Fig. 2 is an enlarged perspective view of the hub detached from the frame.

Figs. 3, 4 and 5 are detail views of various modifications of the finger grooves.

The reel consists of two side flanges or discs 1, 1, and a hub 2. The hub is formed from a single strip of sheet metal which is shaped in such a manner as to provide a central bearing 3, and one or more finger grooves 4.

The walls of these grooves may have corrugations 5, therein, and be further provided with a substantially round aperture 6, the purpose of all of which is to present suitable gripping means. Other gripping means are shown in Figs. 3, 4 and 5. In Fig. 3 the wall is simply corrugated, while in Fig. 4 the wall is smooth and has a finger aperture 6 therein. In Fig. 5 an oblong opening is provided and the surface of the wall is broken by the corrugations 5, and by irregular protuberances 8.

Tongues 9 are stamped from the sheet metal strip and are for a purpose to be hereinafter described.

Tabs 10 are provided on the edges of the sheet metal strip forming the hub, for the purpose of securing the hub to the reel flanges as shown in Fig. 1. The tabs are passed through suitable slots in the flanges and then bent over. Others of these tabs 10 are bent over portions of the metal strip, thereby firmly securing adjacent portions of the strip which connect the periphery of the hub with the bearing 3.

The reel flanges are partly cut away at 11, 11, and are also provided with radial slots 12, 12, the purposes of which will later appear. The flanges are also provided with openings 13, 13, which align with the finger grooves 4.

The finger grooves 4 have a dual function, which will now be described.

One function is to quickly and firmly secure the film end so that no slipping can occur during the winding operation. This is accomplished by drawing the film partially around the hub, then pressing, with the finger, a bight of the film into the groove, and then turning the reel, whereby the film is wrapped on itself and securely held. In forming the groove the metal is so bent that a relatively narrow opening is left for the entrance of the finger, and from the entrance the groove widens out. This particular shape is to prevent the finger slipping from the groove during the film securing operation. The edge of the finger is passed through the opening and then when the finger is rotated it is substantially locked in the groove. It will be understood that one groove, or a plurality of grooves may be provided.

The other function of the finger grooves is to present means for removing the reel from its case. Reel cases are practically always dented and otherwise deformed and in the present practice it is usually necessary to insert a tool between the periphery of the reel and the wall of the case and pry the reel out, thereby often damaging the reel or film, or both. This is obviated by my new reel, in which one simply passes the fingers through openings 13 of the flange into the grooves 4, and lifts the reel from its case. In order that the fingers may secure a firm grip in the grooves, these grooves are corrugated and provided with a finger hole 6. I have shown several forms of finger grips, but these should be construed in an illustrative rather than in a limiting sense, as any suitable means may be substituted for the means shown.

In the ordinary wooden hub now used a spring clip is provided for receiving the end of the film. In the present reel a tongue 9 is stamped from the sheet metal strip forming the hub, and the film-end may be secured under this tongue. It will be understood, of course, that this tongue may be used independently of the groove, i. e., the film-end may be secured entirely by the tongue, the tongue taking the place of the spring clip now in use. Or, the tongue and groove may be used in conjunction, in which case the film-end is placed under the tongue, and a bight of the film pressed into the groove. Or, the groove may be used independently of the tongue, in such case the film-end is secured in the manner which has been previously described.

I will now describe that feature of the invention by which the time for running off any length of film is readily ascertained. It is highly desirable to know beforehand the time required for running off the film, and to this end the flanges are provided with the previously mentioned cut away portions 11, and slots 12, which together with the open frame work of the flanges permit a determination of the amount of film on the reel. Placed on the flanges are numerals which indicate the length of film on the reel, and adjacent these numerals are other numerals which indicate the time required to run off that amount of film. For example, if the coil of film extends out as far as numeral 700, Fig. 1, then it is evident that the film is 700 ft. long, and the adjacent numeral will show that 10 minutes is the time required. It will be understood that this is a time indicator, and is not in any sense a measuring device.

Having fully described my invention, what I claim as new and desire to secure by Letters Patent is:

1. In a film reel, a metallic hub, said hub being formed from a strip of sheet metal, and so shaped as to provide a finger groove in the periphery thereof.

2. In a film reel, a metallic hub, said hub being formed from a strip of sheet metal, and so shaped as to provide a finger groove in the periphery thereof, the edges of said finger groove projecting over said groove, whereby the finger is substantially locked therein.

3. A film reel including side flanges and a metallic hub, said hub formed from a single strip of sheet metal, and so shaped as to form a finger groove in the periphery thereof, tabs on said hub, whereby said hub is secured to said flanges, one of said flanges provided with an aperture in substantial alignment with said finger groove.

4. A film reel including a metallic hub, said hub formed from a single strip of sheet metal and so shaped as to provide a finger groove in the periphery thereof, the wall of said groove being provided with a gripping surface.

5. A film reel including a metallic hub, said hub having a plurality of finger grooves therein, the walls of said grooves being provided with gripping surfaces.

6. In a film reel, a metallic hub, said hub formed from a strip of sheet metal, and so shaped as to provide a plurality of finger grooves in the periphery thereof, the walls of said grooves being corrugated to present a gripping surface.

7. A film reel including a metallic hub, said hub formed from a strip of sheet metal, and so shaped as to provide a plurality of finger grooves in the periphery thereof, the walls of said grooves having a finger hole therein.

8. A film reel including a metallic hub, said hub formed from a single strip of sheet metal, and so shaped as to provide a finger groove in the periphery thereof, the walls of said finger groove being corrugated and having a finger hole therein.

9. A film reel including a metallic hub, said hub formed from a strip of sheet metal, and so shaped as to provide a finger groove in the periphery thereof, and a tongue stamped from said hub adjacent said groove.

10. A film reel including a metallic hub, said hub formed from a single strip of sheet metal, and so shaped as to provide a finger groove in the periphery thereof, the wall of said finger groove being corrugated and having a finger hole therein, and a tongue stamped from said hub adjacent said finger groove.

Signed at New York, N. Y., this 10th day of March, 1920.

GERARDO PASSAVANTI.